Jan. 27, 1959 E. D. EARLY 2,871,374

COMPUTER NETWORK FOR THE ECONOMIC LOADING OF POWER SOURCES

Filed Nov. 19, 1957 3 Sheets-Sheet 1

Jan. 27, 1959 E. D. EARLY 2,871,374

COMPUTER NETWORK FOR THE ECONOMIC LOADING OF POWER SOURCES

Filed Nov. 19, 1957 3 Sheets-Sheet 2

Jan. 27, 1959 E. D. EARLY 2,871,374

COMPUTER NETWORK FOR THE ECONOMIC LOADING OF POWER SOURCES

Filed Nov. 19, 1957 3 Sheets-Sheet 3

2,871,374
Patented Jan. 27, 1959

2,871,374

COMPUTER NETWORK FOR THE ECONOMIC LOADING OF POWER SOURCES

Edwards D. Early, Birmingham, Ala.

Application November 19, 1957, Serial No. 697,359
19 Claims. (Cl. 307—57)

Figure 1:
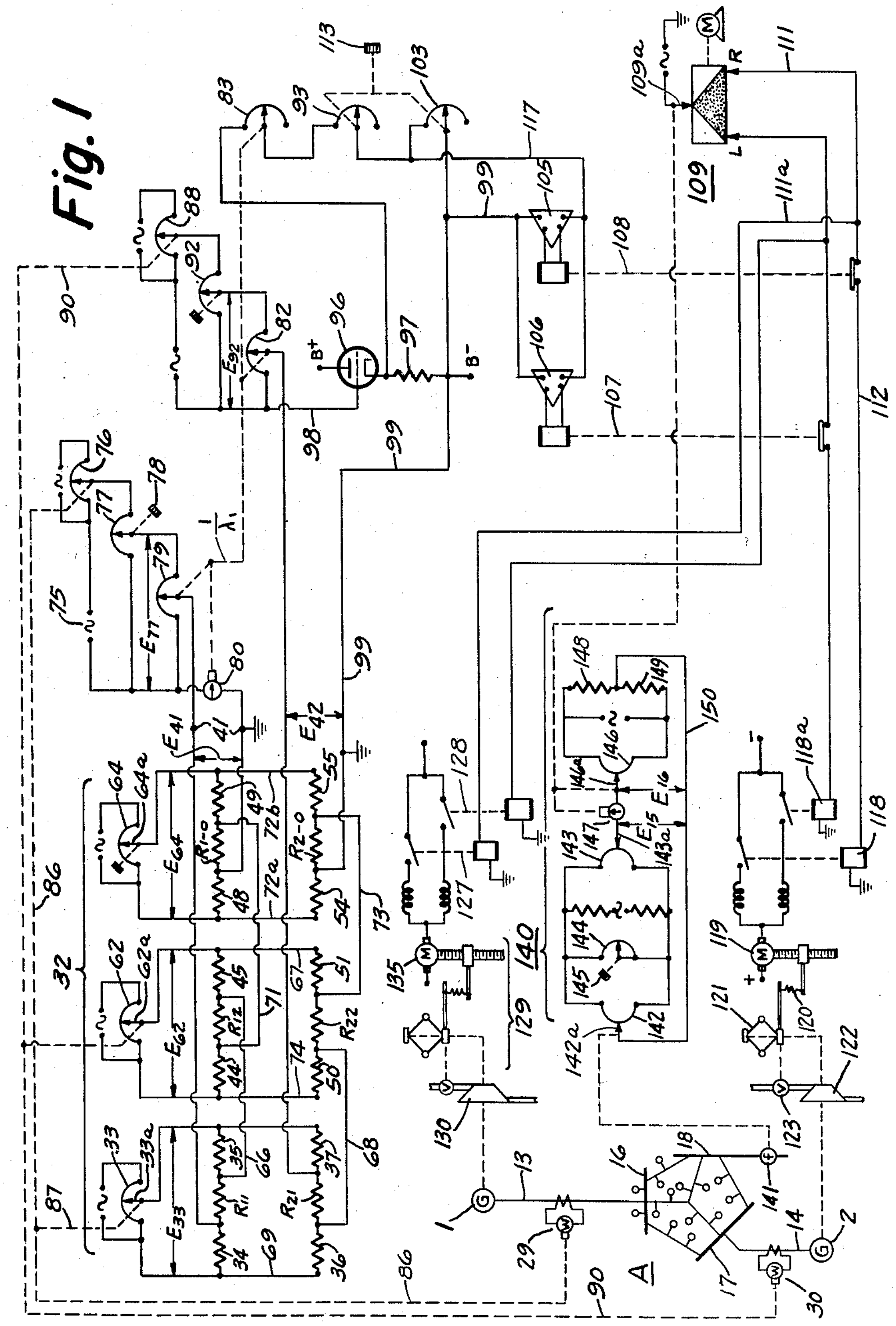

This invention has for an object the provision of methods of and means for loading interconnected generating stations forming an electrical power system so that the total cost of system generation (including losses) is a minimum, and has for a further object the provision of a reliable simplified system by means of which the generation of the respective power sources may be brought to values which yield minimum cost of operation of the system as a whole.

The present invention embodies many features disclosed and claimed in my parent application Serial No. 433,511, filed June 1, 1954, which issued May 27, 1958, as Patent No. 2,836,730, for "Economic Loading of Power Systems."

In my parent application I have explained at length the problems which have confronted utility engineers in determining the most economic loading of the several generating stations of a power system, and I have also disclosed certain systems providing methods and apparatus for determining the proper loading of the power sources, as well as automatic systems for maintaining the most economic distribution of the load among the power sources of the power system.

While in my parent application I disclosed several modifications of computing networks and additional modifications illustrating the automatic control of generation at the several stations of the power system, something was left to be desired in simplifying the computing system and also in the manner in which there is achieved optimum division of generation.

In carrying out the present invention in one form thereof, the computing network is characterized by the absence of transformers and switches and comprises a relatively simple conductively-connected resistor network. Further in accordance with the invention, there has been eliminated in the multiplicity of summing circuits provided for the several rows and columns effects of circulating or "sneak" currents, which effects, if present in significant magnitude, would introduce appreciable errors. More particularly, the network includes in each of a plurality of circuits of each column pairs of impedances or resistors of large magnitude compared with the impedances or resistances of circuit components connected intermediate the two impedances of each pair, the arrangement being such that any undesired circulating or sneak current must traverse from two to four of the impedances of high value. The potential differences producing flow of the sneak currents are of a low order of magnitude, and I have found that the provision of multiple high-valued resistors in each path thereof highly effective in minimizing their effects on the computer output. Further in accordance with the present invention, such errors can be, and preferably are, reduced to zero by slight modification of the values of the impedances or resistors in the computing network to compensate for the low order of circulating sneak currents.

Further in accordance with the present invention, there have been eliminated the multiplicity of servos or repeating devices utilized in the modifications of my parent application. This has been accomplished by the provision of a different type of circuit, one which minimizes current drain from the network and which, at balance, reduces current flow from the network to zero.

While modifications of my parent application can be utilized in conjunction with the computing network of the present application, the system of the present application offers some additional advantages in the control of generation. More particularly, the system as a whole has been simplified, and the computation of the system lambda ($\lambda$) is made unnecessary. As fully explained in my parent application, lambda is defined as the incremental cost of power delivered to the load by a power source. In accordance with the present invention, the lambda of a selected power source is utilized as a reference. The system provides for the control of the generation of the remaining power sources to change the lambda of each in a direction to approach and to equal that of the power source selected as the reference. Moreover, the system can provide output signals or recorder readings representative of the changes in generation required at each source to make its lambda equal to the reference lambda, such as that of the reference source.

Figure 2:
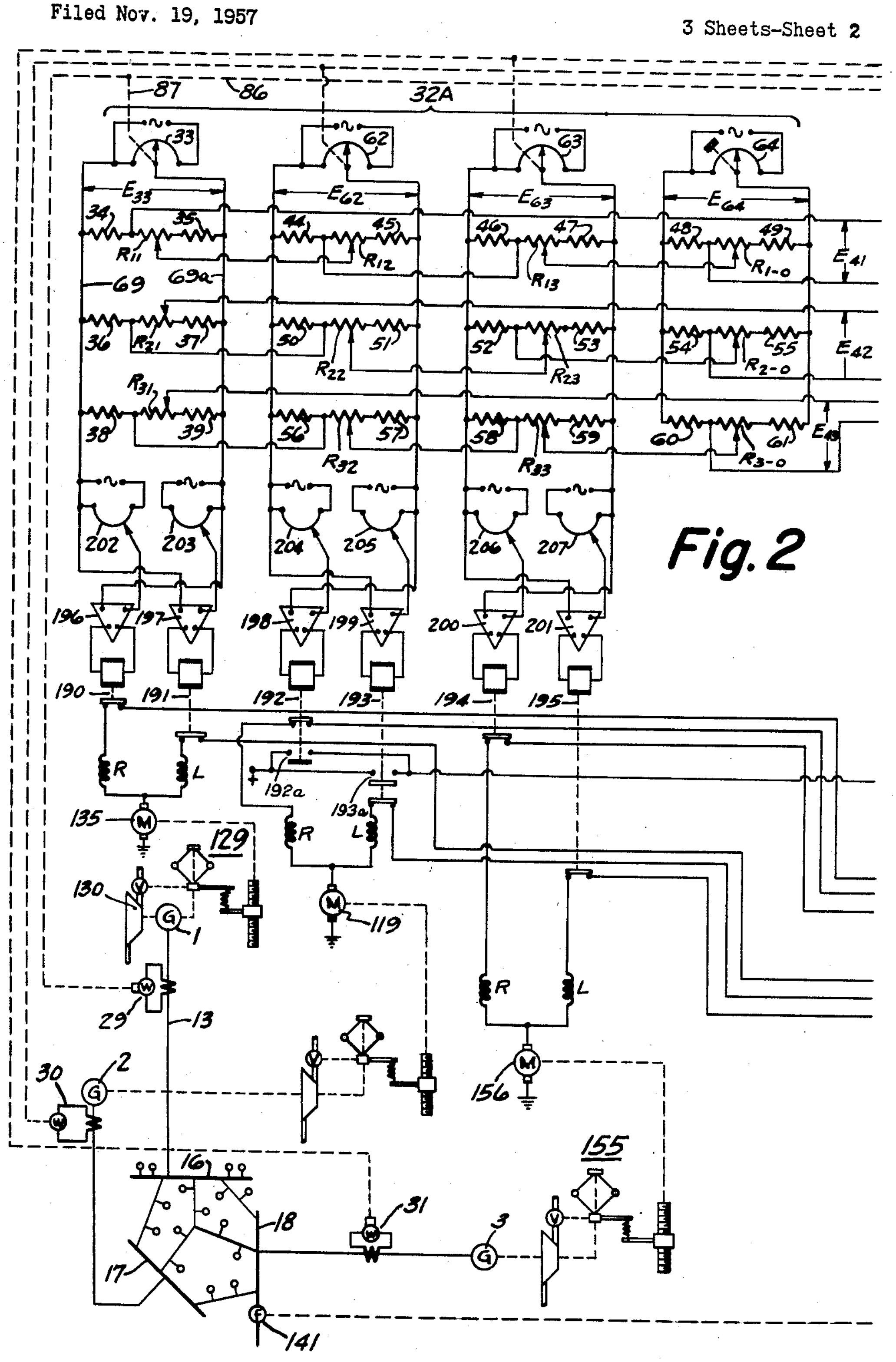
Figure 3:
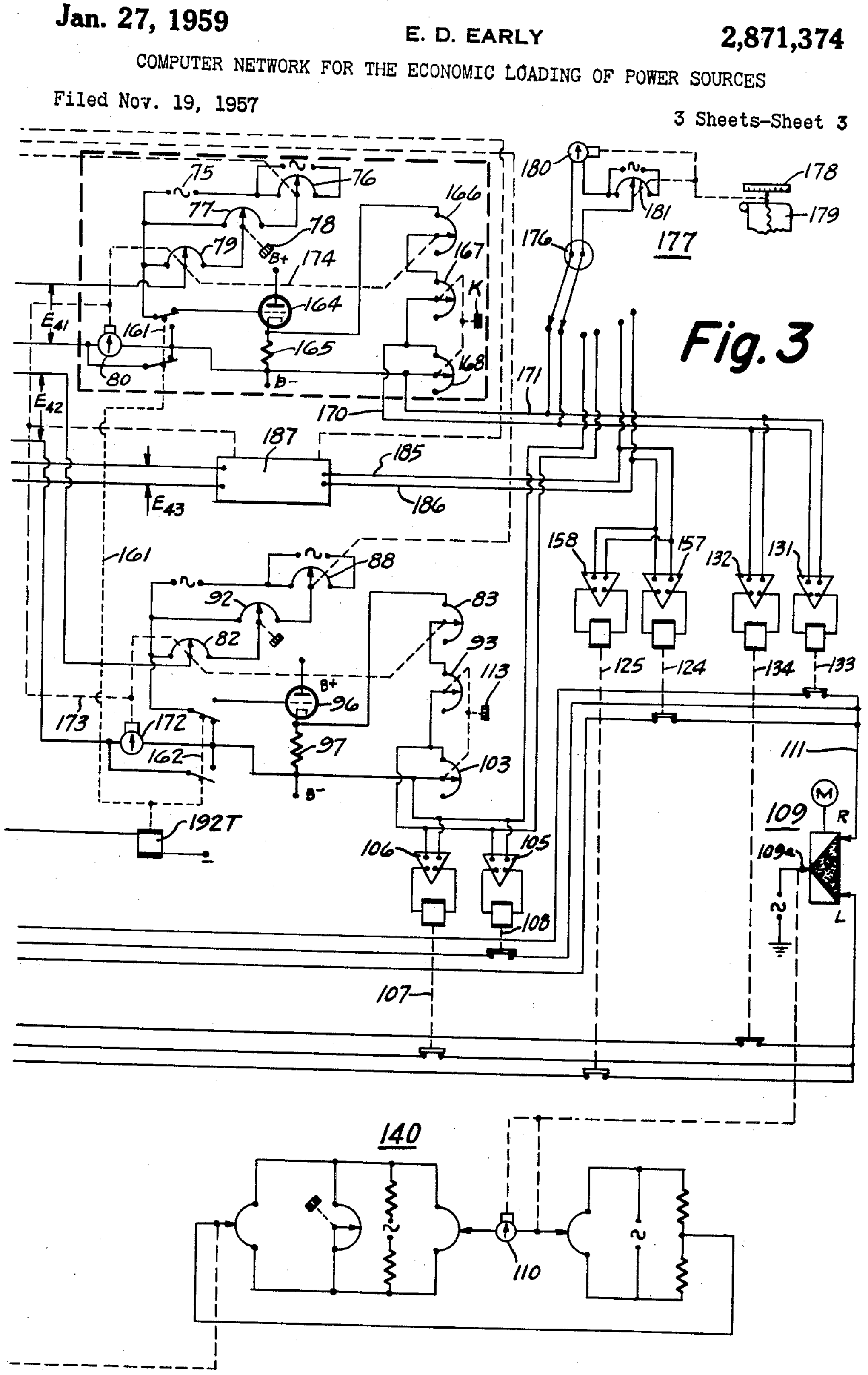

For a more detailed development of the underlying theory, for a description of the additional flexibility provided in accordance with the present invention, and for further objects and advantages of the invention, reference is to be had to the following detailed description taken in conjunction with the accompanying drawings, in which:

Fig. 1 is a schematic diagram of a system greatly simplified for ease in understanding the theory and operation underlying the invention; and Figs. 2 and 3 present a schematic diagram of a preferred modification of the invention.

Referring to the drawings, the invention in one form has been shown as applied to a relatively simple power generating and distributing system including but two power sources shown as generators 1 and 2 respectively supplying power by way of conductors 13 and 14 to their respective station busses 16 and 17. The station busses are interconnected by power transmission lines of an area A for the supply of power to loads, the load centers of which have been indicated by the small circles.

It is to be understood that each generator and associated bus may also have local loads, two load centers being illustrated for the bus 16. As will be later explained, the area A, comprising the power sources and the transmission lines interconnecting the station busses, may be interconnected by way of tie-lines, not shown in Fig. 1, with other areas, with exchange of power between them. It is to be further understood that the respective generators 1 and 2 may be located in one or in different power stations, and there may be more than one generator in each power station. The effort in Fig. 1 has been to simplify the system as much as possible to make easier a full and complete understanding of the basic principles underlying the invention and the manner in which they have been utilized in providing new methods and systems of controlling the load on the several power sources to produce delivery of power at the load centers at a minimum total cost.

An inspection of area A will reveal that power supplied to the load centers connected to the transmission lines interconnecting the several station busses may come from any one or both of the generators.

As explained in an A. I. E. E. Technical Paper No. 55-90 entitled, "A General Transmission Loss Equation," made a part hereof by this reference thereto, and jointly authored by me and by Messrs. R. E. Watson and G. L.

Smith, the total transmission loss can be expressed by the following equation:

$$P_L=\Sigma_m\Sigma_n P_m B_{mn} P_n+\Sigma_n B_{n0} P_n+K_{L0}$$

where $P_L$=total transmission loss,
$P_m$=power of source "$m$,"
$P_n$=power of source "$n$,"
$B_{mn}$ are constants to be determined; they are dependent on the transmission network (and other factors later to be mentioned),
$B_{n0}$ is a constant representing the incremental loss of each source under the condition of zero system power supply, and
$K_{L0}$ is a constant of integration representing total system losses under the condition of zero system power supply.

To the mathematician, Equation 1 states that the total transmission loss includes a double summation involving only the electrical power outputs of the sources $P_m$ and $P_n$ and the constants $B_{mn}$, a single summation involving the power outputs of the sources $P_n$ and the constants $B_{n0}$, and the constant $K_{L0}$. If the system has ten sources, the $m$ index assumes all values of whole numbers from 1 to 10, and the $n$ index likewise will assume all values of whole numbers from 1 to 10.

Equations of the same type as Equations 4 to 6 of my parent application are applicable to the present system, and they are as follows:

$$\frac{\partial P_L}{\partial P_1}=2B_{11}P_1+2B_{12}P_2+B_{10} \quad (2)$$

$$\frac{\partial P_L}{\partial P_2}=2B_{21}P_1+2B_{22}P_2+B_{20} \quad (3)$$

An examination of each of the foregoing Equations 2 and 3 reveals that the incremental transmission loss for each of the power sources $P_1$ and $P_2$ is expressed as a ratio, i. e., non-dimensional, rather than in kilowatts. It is also important to observe that if the incremental transmission losses are found to be 0.2, by way of example, for the power source $P_1$, it does not mean that under the particular loading conditions 20% of the power is lost in transmission. It does mean, however, that 20% of the next incremental unit of power generated at said source and transmitted to the load will be lost in transmission; and it also means that 20% of the preceding like incremental unit of power generated at said source was lost in transmission. The foregoing illustrates the meaning of incremental transmission loss and suggests that it may rise fairly rapidly with increased power output. Though the total transmission losses for a given level of power output may be only 5% or 6%, yet the incremental transmission loss for a given source at that given level may be much greater than 20%.

Further inspection of Equations 2 and 3 will make apparent the fact that the first term on the right-hand side of each equation includes the generation $P_1$; and the second term of each equation has in common the power generation $P_2$. The right-hand side of each equation, besides including power generation, $P_1$ and $P_2$, includes only the "B" constants.

In accordance with the present invention, there is provided a computer network 32, in matrix form, where the resistances of certain resistors are selected to represent the "B" constants, the values of such resistances being adjusted to compensate for the effect of circulating or sneak currents within the network itself. In the computing network 32, $m$ is the row index and $n$ is the column index. For example, the resistor $R_{11}$ is shown in the first row and in the first column; $R_{21}$ is in the second row and first column. Similarly, in the second column there appear, in the first and second rows, resistors $R_{12}$ and $R_{22}$. The value of each resistor is selected so that in the operation of the network its voltage output is representative of each coefficient multiplied by the respective power outputs $P_1$ and $P_2$, the resistors having the same subscripts as the coefficients of Equations 2 and 3. Thus, the present computer network 32 while similar to the computing networks in my parent case, differs therefrom in that there is avoided in network 32 the use of isolating transformers, and there is also avoided the need to include a plurality of switches to prevent circulation of current within the computing network.

In accordance with the present invention, the network as a whole is conductively coupled without inclusion of transformers or switches, and the effect upon the results obtained from the several output circuits of circulating currents is reduced to zero in the determination or control of generation of the several power sources.

For the first column there is provided an adjustable source of voltage, shown as formed by a slidewire 33 energized from any suitable source as indicated by the supply terminals and the symbol for alternating current. A direct-current source of supply is equally applicable and in some cases may be preferred. The symbol for the several sources of supply will for convenience be that of alternating current, it being understood that direct-current sources of supply will at all times be applicable and suitable.

The computing network 32 of Fig. 1 is characterized by a first group of circuits associated with the several columns. For example, the voltage $E_{33}$ developed across an effective portion of the slidewire 33 is applied to a circuit having two branches respectively including the resistors $R_{11}$ and $R_{21}$. In each branch circuit, for example the first one, there are included resistors 34 and 35 with the resistor $R_{11}$ connected between or intermediate them. The resistors 34 and 35 have resistance values high relative to the resistance of resistor $R_{11}$. Similarly, resistor $R_{21}$ is connected between or intermediate high-valued resistors 36 and 37. As later explained, the resistors $R_{11}$ and $R_{21}$ are thereby made reasonably free from the effects of circulating or sneak currents by reason of the reduction in the magnitude of such currents. By high-valued resistors, I mean resistors having a resistance of the order of at least ten times that of the resistors $R_{11}$ and $R_{22}$, and preferably in excess of twenty times the largest of the resistance values of the computing resistors, such as $R_{11}$ and $R_{22}$. As will later be shown, the ratio is not a critical one.

Each of the output circuits 41 and 42 comprises a summing circuit, and each has in series therein one of the intermediate computing resistors of each column. For example, the output circuit 41 has in series therein the resistors $R_{11}$, $R_{12}$ and $R_{1-0}$. All intermediate resistors of each column have associated therewith resistors of said relatively high value and to which sequential reference characters have been applied.

Assuming now that voltages $E_{62}$ and $E_{64}$, respectively derived from slide wires 62 and 64 and their associated sources of supply, are applied to the last two columns of the computing network, it will be understood that current will flow through each branch of each circuit. The potential differences across the several resistors connected in each output circuit will provide an output voltage. Inasmuch as a conductor 66 forming a part of output circuit 41 is connected to the circuit intermediate resistor $R_{11}$ and resistor 35 and also between resistor $R_{12}$ and resistor 45, one path for circulating current may be traced from between resistor $R_{11}$ and resistor 35 by way of conductor 66, the high-valued resistor 45, conductor 67, high-valued resistor 51, low-valued resistor $R_{22}$, conductor 68, high-valued resistor 36, conductor 69, and by way of high-valued resistor 34 and resistor $R_{11}$ to complete the loop circuit.

It is to be observed that in the foregoing loop circuit four high-valued resistors 45, 51, 36 and 34 must be traversed by any current circulating therein. Its magnitude will be decreased to a small value by reason of the high resistance in the current path and the low order of potential unbalance which gives rise to the circulating current. Thus, so long as each of the high-valued resistors greatly exceeds the resistance of the low-valued resistors, the effect of the circulating current is greatly reduced. While for some applications it is conceivable that a partial reduction in circulating currents will sufficiently minimize any error in the potential difference developed in the output circuits to a tolerably low value, it is preferred that the error due to circulating current be entirely eliminated.

Before describing how the effect of sneak currents is fully compensated, reference will be made to other paths for circulating current which can be readily identified by those skilled in the art. For example, from the point of origin between high-valued resistor 44 and $R_{12}$ circulating current may flow by way of conductor 71, high-valued resistor 49, conductor **72*b*, high-valued resistor 55, conductor 73, resistor $R_{22}$, high-valued resistor 50, conductor 74 and to the point of origin by way of a high-valued resistor 44. Thus, in the foregoing circuit there are again present four high-valued resistors 49, 55, 50 and 44. There are at least two high-valued resistors in each loop circuit in which circulating currents can flow. Without the grounded output circuits there will be four high-valued resistors in each path of the sneak currents. The grounded output circuits are advantageous, however, and I have found they may be used without introduction of error. A path including two high-valued resistors may be traced from conductor 72*a*, high-valued resistor 48, and to ground, and from the lower ground-symbol by conductor 99 and high-valued resistor 54 to conductor 72*a* and resistor 48**.

In my said parent application I presented at length the equations and the procedures which may be utilized in the determination of the "B" constants, more particularly, the $B_{mm}$ self-constants and the $B_{mn}$ mutual constants. The "B" constants may be determined either by the method set forth in my parent application or in accordance with the procedures discussed in the said A. I. E. E. Paper No. 55–90. For purposes of the present invention, it may be assumed that the "B" constants for the system of Fig. 1 have been determined and are as follows:

*Table I*

$2B_{11}=.2828$
$2B_{12}=-.1228$
$B_{1-0}=.0174\ (1.0-B_{1-0}=.9826)$
$2B_{21}=-.1228$
$2B_{22}=.3804$
$B_{2-0}=-.0674\ (1.0-B_{2-0}=1.0674)$ where values of "P," power outputs of each source, are expressed in units of 100 megawatts, and incremental losses $$\frac{\partial P_L}{\partial P_m}$$

are expressed as a ratio.

With the high-valued resistors having resistance values at least fifty times the highest resistance value of the computing resistors, additional compensation for sneak currents will not be required for many applications of the invention. With analog constants of $$100\text{ mw.}=\frac{2R_b}{10}\text{ volts}$$

unity=1.0 volt $$E_{64}=\frac{2R_b+5}{5}$$

where $R_b=R_{34}, R_{35}\ldots$), the following resistance values will be representative of the coefficients of Equations 2 and 3, the "B" constants and multiples of Table I.

*Table II*

$R_{11}=2.828\Omega$ $R_{21}=1.228\Omega$
$R_{12}=1.228\Omega$ $R_{22}=3.804\Omega$
$R_{1-0}=4.913\Omega$ $R_{2-0}=5.118\Omega$
$R_b=250\Omega$ Resistors having the foregoing values may be used satisfactorily in the system of Fig. 1. For some applications, it is preferred to take into account another variable. Referring to Fig. 1 and to Table II, it will be seen that the resistor $R_{11}$ is equal to 2.828Ω and that $R_{21}$ is equal to 1.228Ω. If resistors 34, 35, 36 and 37 have the same resistance values, a slightly higher current will flow in the branch including $R_{21}$. Since the unit current flow in each branch represents the load on a generator, it is desired to have the currents in the two branches equal. This may be accomplished by modifying the values of resistors 34 and 35 or of resistors 36 and 37 to make equal the total resistances of the branches including resistors $R_{11}$ and $R_{21}$.

However, I prefer to modify the values of the precision computing resistors to provide the required compensation. With the analog current taken as $$\frac{E}{2R_b}$$

where $R_b=R_{34}, R_{35}\ldots$ etc., the changed value $R'_{11}$ may be determined from the equation:

$$R'_{11}=\frac{R_{11}}{1-\frac{R_{11}}{2R_b}} \qquad (4)$$

where $R_b=R_{34}=R_{35}$.

Like equations apply to each of the remaining computing resistors.

The corrected values of the resistors are as follows:

*Table III*

$R_{11}=2.844\Omega$ $R_{21}=1.231\Omega$
$R_{12}=1.231\Omega$ $R_{22}=3.833\Omega$
$R_{1-0}=4.913\Omega$ $R_{2-0}=5.118\Omega$
$R_b=250\Omega$ In the preferred form of the invention, the computing resistors have values representative of the "B" constants and are compensated for sneak currents. Before explaining how such modified values are obtained, reference will be made to that part of the network 32 energized by the voltage $E_{64}$. That portion of the network has two purposes. First, it accomplishes the subtraction from unity of $$\frac{\partial P_L}{\partial P_m}$$

This subtraction is indicated by the reversal of the connections to $R_{1-0}$ and $R_{2-0}$ relative to the connections to $R_{11}$ and $R_{22}$. Thus there is performed by the computing network 32 the requirements of the denominator of the following equation:

$$\lambda G_m=\frac{\frac{dF_{Gm}}{dP_{Gm}}}{1-\frac{\partial P_L}{\partial P_m}} \qquad (5)$$

This equation is for lambda (λ) defined as the incremental cost at the station of power delivered to the load as by a generator G in a station *m*.

The second function of that portion of network 32 energized by the voltage $E_{64}$ is to add the last terms of the Equations 2 and 3 to the summing circuits. Values for the resistors $R_{1-0}$ and $R_{2-0}$ which introduce a potential representative of unity are modified so that in each case there is introduced the algebraic sum of unity and and the value of $B_{1-0}$ in one summing circuit and $B_{2-0}$ in the other summing circuit.

Assuming the source $E_{64}$ is 101 volts, and 0.5 volt per megawatt for each of the sources $E_{33}$ and $E_{62}$ (corresponding with 200 megawatt maximum loads), and the high-valued resistors 250 ohms each, and output impedances for the output circuits 41 and 42 of 2,000 ohms each, the values of the computing resistors will be as follows:

*Table IV*

| | |
|---|---|
| $R_{11}=2.901\Omega$ | $R_{21}=1.297\Omega$ |
| $R_{12}=1.385\Omega$ | $R_{22}=4.052\Omega$ |
| $R_{1-0}=4.910\Omega$ | $R_{2-0}=5.414\Omega$ |

From a comparison of the resistance values given in Tables III and IV, it will be seen that the change required in the computing resistors representative of the "B" constants in order to compensate for the sneak currents is of a low order, presenting a change of resistance of the order of 13% or less. The percent change in the values of the intermediate or computing resistors will be affected by the resistance values selected for the high-valued resistors, the percent change for the intermediate resistors being decreased as the value of the high-valued resistors is increased.

Though other methods may be used in determining the values of the computing resistors, one satisfactory method will be briefly indicated.

Pursuant to the theory of topology, there will be required 11 mesh equations (13 nodes, 1 sub-network, 23 branches, and 12 basic node pairs) pursuant to "Matrix Analysis of Networks" by Le Corbeiller (1950). The eleven equations are then solved either simultaneously or by matrix algebra to obtain the mesh currents expressed in terms of $E_{33}$, $E_{62}$ and $E_{64}$.

With the branch currents identified by the same subscripts as for the computing resistors therein, the following equations apply:

$$i_{11}=.0019788E_{33}+.0000174E_{62}+.000003191E_{64} \quad (6)$$

$$i_{12}=.0000155E_{33}+.0019551E_{62}+.000000114E_{64} \quad (7)$$

$$i_{1-0}=.0000130E_{33}-.0000410E_{62}+.001983262E_{64} \quad (8)$$

The output voltage $E_{41}$ may be expressed by the following equations:

$$E_{41}=i_{11}R_{11}-i_{12}R_{12}-i_{1-0}R_{1-0} \quad (9)$$

and $$-E_{41}=(2B_{11}P_1+2B_{12}P_2+B_{1-0}-1)K \quad (10)$$

where K is equal to the analog constant (for Table III, $K=1.0$).

The above procedures and typical equations provide a general solution for determination of the values of the computing resistors for any given application.

By utilizing output resistors with resistance values modified as set forth above to take into account the sneak currents, their effect is fully compensated over the full range of voltage values assumed by $E_{33}$ and $E_{62}$ in respectively representing change in power of a station from zero load to maximum load.

Since 100% compensation for sneak currents is achieved, it will now be seen that there may be wide variation in the resistance value selected for the high-valued resistors. While they can have the same nominal value, they need not be precision resistors, as in the case of the computing resistors.

With the fully compensated computing resistors in the network 32, a reduction in the impedance of the output circuits 41 and 42 by a factor as high as ten has but a small effect on the output voltages, of the order of 1%. As a matter of fact, such a change in impedance may not affect to any degree one output voltage and will only affect the other output voltage to a small degree, of the order of 1%.

The foregoing indicates that the current drawn from the output circuits may vary over a wide range without consequential change in the output voltages. Moreover, by reason of the grounded output circuits, the computing network is not "floating" above ground and, hence, there are minimized effects of pick-up from stray fields and the like.

While the mathematical approach which I have briefly outlined may be preferred, it is to be understood that the changes in the values of the computing resistors required to compensate for the sneak currents may be ascertained experimentally and by conventional methods of trial adjustment of their values. More particularly, the resistance values set forth in Table II could be utilized in the network 32 of Fig. 1, and the described procedures applied. However, it is preferred to utilize the table of resistance values appearing at Table III inasmuch as these have already been modified to correct for improper current flow through the computing resistors, exclusive of sneak currents. Accordingly, the computing resistors having the values of Table III are connected as shown in Fig. 1. The voltages $E_{62}$ and $E_{64}$ are reduced to zero value and the voltage $E_{33}$ applied. The values of resistors $R_{11}$ and $R_{21}$ are then adjusted until the voltages respectively appearing at the output circuits 41 and 42 correspond with the computed values in terms of the applied voltage $E_{33}$.

The foregoing steps are repeated with the voltages $E_{33}$ and $E_{64}$ at zero and with a finite voltage $E_{62}$ applied. After a similar adjustment with the application of the voltage $E_{64}$, the procedures are again repeated. Each of the subsequent adjustments required will be small as compared with the initial changes in the values of the resistors. However, after the second adjustments have been completed, third adjustments may be undertaken if desired.

In order conveniently to use the experimental or trial-and-error method described above, there has been illustrated in Fig. 2 in the computer network 32A an adjustable contact for each of the computing resistors $R_{11}$, $R_{12}$ et seq. In accordance with the modification of Fig. 2, the total resistance of each branch circuit of each column may be made equal.

Now that there has been described the manner in which the incremental transmission loss may be ascertained, attention will be directed to that part of the system for producing signals or voltages representative of the incremental cost of power generation.

Mathematically, it can be shown that the relation between fuel input and generator output of generator G in station $m$ can be expressed by the following relationship:

$$I_{Gm}=\text{input}=a+bP_{Gm}+cP^2_{Gm} \quad (11)$$

where input is expressed as $10^6$ B. t. u. per hour, $P_{Gm}$=megawatt output for generator G in station $m$, and $a$, $b$ and $c$ are constants.

The foregoing may be converted to incremental input by differentiating, viz:

$$\frac{dI_{Gm}}{dP_{Gm}}=b+2cP_{Gm} \quad (12)$$

To convert the above equation to incremental cost, it will be assumed that the cost of fuel per million B. t. u. at station $m$ is $f_m$. Accordingly, $$\frac{d(f_mI_{Gm})}{dP_{Gm}}=\frac{dF_{Gm}}{dP_{Gm}}=(b+2cP_{Gm})f_m \quad (13)$$

As explained more at length in my parent case (page 52), a source 75 has a voltage representative of the "$b$" term of the above equation, and the voltage derived from the slidewire 76 by way of its movable contact represents the "$2cP_{Gm}$" term of the above equation. The multiplication of the right-hand side of the above equation by "$f$" is accomplished by the slidewire 77 with its contact adjustable as by a knob 78. The setting of the slidewire contact provides any desired fraction of the resultant voltage for developing an output representative of the incremental cost of generation for the then existing cost of fuel. This output $E_{77}$ is representative of the numerator of Equation 5, while the voltage $E_{41}$ across the output circuit 41 is representative of the denominator of said equation.

Obviously, the foregoing equation for station $m$ can be rewritten as follows for a single generator:

$$\lambda_m=\frac{\frac{dF_m}{dP_m}}{1-\frac{\partial P_L}{\partial P_m}} \text{ and } \frac{1}{\lambda_m}=\frac{1-\frac{\partial P_L}{\partial P_m}}{\frac{dF_m}{dP_m}} \quad (14)$$

or, $$\left(1-\frac{\partial P_L}{\partial P_m}\right)-\frac{\frac{dF_m}{dP_m}}{\lambda_m}=0 \quad (15)$$

and, $$\left(1-\frac{\partial P_L}{\partial P_m}\right)\lambda_m-\frac{dF_m}{dP_m}=0 \quad (16)$$

By applying the voltage $E_{77}$ to a slidewire 79 whose contact is positioned by a detector 80 included in one of the output circuits, the position of the contact will be representative of $$\frac{1}{\lambda_1}$$

Thus, the detector 80 adjusts the contact until the fraction of voltage $E_{77}$ is equal to the output voltage of output circuit 41. When this occurs, the conditions of the second form of Equation 14 have been satisfied and the position of the contact of slidewire 79 is then representative of the quantity $$\frac{1}{\lambda_1}$$

If the slidewire 79 be connected across the output circuit 41 and a fraction of its voltage balanced against $E_{77}$, the conditions of the first form of Equation 14 will be satisfied. (A similar circuit change would at the same time be made for slidewire 82.)

It is to be observed that the detector 80 may be of any suitable type, such as disclosed in Williams Patent No. 2,113,164. Detector 80 not only adjusts the contact of slidewire 79, but it also adjusts the contacts of slidewires 82 and 83.

With the above preliminary analysis in mind, it will be assumed that the load on the system is changing, for example, increasing. The generation of source 1 would likewise be increasing. The wattmeter 29 responds and actuates the contact of slidewire 33 as indicated by the broken lines 86 and 87 and likewise adjusts the slidewire contact of slidewire 76. Due to the concurrent adjustments of the slidewire contacts of slidewires 33 and 76, a new value of $$\frac{1}{\lambda_1}$$

will be computed and the contact of slidewire 79 will be moved by detector 80 to a correspondingly different position.

The generator or source 1 will now be considered a reference source, the remainder of the control system then functioning to change the generation in manner such that the lambda $$\left(\text{or } \frac{1}{\lambda_2}\right)$$

of the remaining source 2 is equal to the lambda $$\left(\text{or } \frac{1}{\lambda_r}\right)$$

of the reference source 1. This is accomplished without the need to provide any additional detectors or servos of any kind. These desired simplifications in part come about by reason of a novel solution of either Equation 15 or 16 in which there is provided a means for taking the difference between the first and second terms; or, Equation 15, between the quantity $$\left(1-\frac{\partial P_L}{\partial P_m}\right)$$

and the quantity $$\left(\frac{\frac{dF_m}{dP_m}}{\lambda_m}\right)$$

For convenience, there will now be presented another form of equation for $\lambda_m$ for the existing generation $P_m$ at station $m$:

$$\lambda_m=\frac{(b_m+2c_mP_m)f_m}{1-\frac{\partial P_L}{\partial P_m}} \quad (17)$$

With a changed generation level from $P_m$ to $P_m'$ and where $\lambda_m=\lambda_r$, the following equation applies:

$$\lambda_r=\frac{[b_m+2c_mP_m+2c_m(P_m'-P_m)]f_m}{1-\frac{\partial P_L}{\partial P_m}-2B_{mm}(P_m'-P_m)} \quad (18)$$

where $\lambda_r$ is the value of $\lambda$ for the reference station. This will correspond with $\lambda_1$ for source 1 inasmuch as that station has already been referred to as the reference station.

It will be observed from Equation 18 that there appears in the numerator the quantity $$(P_m'-P_m)$$

which represents the change in level of generation. The term $$2c_m(P_m'-P_m)$$

in the numerator represents the change in incremental cost of generation for source $m$ for the given change in generation for that source. The same quantity $$(P_m'-P_m)$$

appears in the denominator. In the denominator the quantity has a multiplier equal to $2B_{mm}$, the transmission loss self-constant. For a given change in generation at source $m$ the term $$2B_{mm}(P_m'-P_m)$$

represents the corresponding change in incremental transmission losses for source $m$. Thus the reference lambda, $\lambda_r$, takes into account the effect of change in existing generation both upon incremental generating cost and incremental transmission losses. Now solving Equation 18 for $P_m'-P_m$:

$$(P_m'-P_m)=\frac{1}{f_m}\left[\frac{\left(1-\frac{\partial P_L}{\partial P_m}\right)-\frac{1}{\lambda_r}(b_m+2c_mP_m)f_m}{\frac{2c_m}{\lambda_r}+\frac{2B_{mm}}{f_m}}\right] \quad (19)$$

If the solution of Equation 16 be used, the following equation applies:

$$(P_m'-P_m)=\frac{1}{f_m}\left[\frac{\left(1-\frac{\partial P_L}{\partial P_m}\right)\lambda_r-(b_m+2c_mP_m)f_m}{2c_m+\frac{2B_{mm}\lambda_r}{f_m}}\right] \quad (20)$$

Before continuing with the explanation of the manner in which a solution is obtained for Equation 19, it is to be remembered that wattmeter 30 associated with the source 2 functions through the mechanical connections to adjust the slidewire 62 in the computing network 32. Wattmeter 30 also functions to adjust slidewire 88 in the additional computing network, which in conjunction with slidewire 92 and the associated sources, produces an output voltage $E_{92}$ representative of $$\frac{dF_2}{dP_2}$$

which, of course, is equal to $(b_2+2c_2P_2)f_2$.

The foregoing voltage $E_{92}$ is applied to the slidewire 82, the contact of which is adjusted by the detector 80 through the mechanical connection indicated by the broken line. The change in the position of the contact of slidewire 82 represents a desired value for lambda for station 2, a value of lambda equal to that of $\lambda_1$ which has been chosen as the reference lambda corresponding with $\lambda_r$ or $$\frac{1}{\lambda_r}$$

Accordingly, a difference voltage will appear between conductors 98 and 99 if $$\frac{1}{\lambda_2}$$

is not equal to $$\frac{1}{\lambda_r}$$

It is to be observed that the output voltage $E_{42}$ represents the quantity $$\left(1-\frac{\partial P_L}{\partial P_2}\right)$$

The voltage $E_{42}$ is applied in series with the voltage between the contact of slidewire 82 and the side of the slidewire connected to the grid of tube 96. If $$\frac{1}{\lambda_2}$$

were to equal $$\frac{1}{\lambda_1}$$

the difference voltage applied to the input circuit of tube 96 would be zero. With $$\frac{1}{\lambda_1}\left(\text{the reference } \frac{1}{\lambda_r}\right)$$

differing from $$\frac{1}{\lambda_2}$$

as assumed above, an input voltage is applied to tube 96 for a proportional output voltage across its output cathode resistor 97. The foregoing may be expressed in terms of Equation 15 and as follows:

$$\left(1-\frac{\partial P_L}{\partial P_2}\right)-\left(\frac{dF_2}{dP_2}\right)\cdot\frac{1}{\lambda_2}=0$$

The first term is represented by $E_{42}$; the second term by $E_{92}$ except for $$\frac{1}{\lambda_2}$$

thereof.

$$\frac{1}{\lambda_2}$$

is not per se determined. Instead, the contact of slidewire 82 is positioned in accordance with $$\frac{1}{\lambda_1}$$

to produce the aforesaid difference voltage whenever $$\frac{1}{\lambda_1}$$

differs from $$\frac{1}{\lambda_2}$$

The manner in which an output signal or voltage is produced to represent the desired change in generation $(P_m'-P_m)$ will now be described.

By reason of a cathode-follower, shown in its simplest form as including a triode 96, and a cathode resistor 97, the regulation effect of the resistor 82 upon the voltage applied to a voltage divider is eliminated. The cathode-follower, also known as a grounded anode amplifier, is used since the signal does not affect anode potential, i. e., no signal is developed in the anode circuit. The cathode-follower prevents current drain from the computing network 32 by reason of the high impedance presented and provides a low-impedance output circuit.

The output voltage from cathode follower 97 is impressed across a computing circuit in the form of a voltage divider. Its first resistor 83 has a resistance value corresponding with the term $2c_2$ of Equation 19. The contact of slidewire 83 is mechanically positioned to correspond with $$\frac{1}{\lambda_1}$$

Thus, the resistance included in the voltage divider from slidewire 83 is representative of the first term in the denominator of Equation 19, i. e.

$$\left(\frac{2c_m}{\lambda_1}\right)$$

The slidewire 93 of the voltage divider has a resistance value corresponding with the term $2B_{22}-1$. The position of the contact of slidewire 93 as set by adjusting knob 113 is representative of the term $$\frac{1}{f_2}$$

The slidewire 103 in the voltage divider has a resistance value representative of unity, and its contact is positioned by the knob 113 to be representative of the term $$\frac{1}{f_2}$$

The combined resistance of the slidewires 93 and 103 represents the second term of the denominator of Equation 19, namely $$\left(\frac{2B_{22}}{f_2}\right)$$

With the voltage divider consisting of resistors representative of the foregoing quantities, and by taking the output voltage from that part of slidewire 103 included in the voltage-dividing circuit, there is obtained a voltage across output conductors 99 and 117 representative of the desired change in generation for source 2, i. e., a voltage representative of $P_m'-P_m$ as given by Equation 19. The resistance of slidewire 103 included in the network is representative of $$\frac{1}{f_2}$$

and so takes care of the $$\left(\frac{1}{f_m}\right)$$

multiplier term for the right-hand side of Equation 19.

The voltages representing the several terms of Equation 19 will now be listed:

$$E_{42}=\left(1-\frac{\partial P_L}{\partial P_2}\right)$$

$$E_{(98\text{ to }99)}=\left(1-\frac{\partial P_L}{\partial P_2}\right)-\left(\frac{1}{\lambda_1}(b_2+2c_2P_2)f_2\right)$$

$E_{(98\text{ to }99)}$ is divided by the voltage divider by the quantity $$\left(\frac{2c_2}{\lambda_1}+\frac{2B_{22}}{f_2}\right)f_2$$

to obtain across the output portion of slidewire 103 a voltage varying as $(P_m'-P_m)$.

The output voltage thus obtained across output conductors 99 and 117 will be of one sign or the other depending upon whether the generation of source 2 is to be increased or decreased in order to bring the incremental cost of delivered power equal to that of the reference source 1.

The output voltage across conductors 99 and 117 is applied to the input circuits of the amplifiers 105 and 106 which control the operation of relays 107 and 108. With zero input voltage, the contacts of relays 107 and 108 will be normally closed. Zero input voltage represents the condition of operation of source 2 with its lambda equal to that of the lambda of the reference source 1. As long as the lambdas are equal, both stations will simultaneously receive raise and lower pulses as developed by a pulse generator 109.

However, if increased generation is needed to bring the incremental cost of delivered power of station 2 equal to that of the reference source 1, the relay 107 will be energized to open its contacts, while the contacts of relay 108 will remain closed.

Accordingly, when the contact **109*a* of pulse generator 109 is moved to the right as by a detector 147, raise pulses will flow from one side of a source of supply by way of the pulse generator and conductor 111, contacts of relay 108, and by conductor 112, to a raise relay 118. This relay is energized to close an energizing circuit for a motor 119 which through adjustment of a spring 120 changes the bias on the governor 121 of the prime mover 122 driving the generator 2. The change in bias on the governor 121 is in a direction to open the control valve 123 to increase the generation of the generator source 2. Simultaneously, raise pulses flow by way of conductors 111 and 111*a* to a raise relay 127 to operate the generator control 129 in the same manner as has been described for the generator control for source 2. Thus, the prime mover 130 will increase (and decrease) the generation of source 1 as raise (and lower) pulses are produced by pulse generator 109**.

Should the contact **109*a* of pulse generator 109 have been moved to the left to initiate production of lowering pulses, the generation of source 2 would not be affected, since the contacts of relay 107 are in the open position. However, station 1** would receive the lowering pulses. The control always functions to change the generation of the sources to make their incremental costs of delivered power equal, the condition of minimum cost of the total power supplied by the system as a whole.

By reason of the fact that the source or generator 1 is taken as the reference source, its generation control including the relays 127 and 128 are always connected to receive raise pulses and lower pulses from the pulse generator 109. However, the other source or generator 2 only receives raise pulses when its incremental cost of delivered power is equal to or less than that of the reference source 1. The source 2 only receives lowering pulses when its incremental cost of delivered power is equal to or greater than that of the reference source 1.

The pulse generator is under the control of an area requirement network 140 of the same general type as described in United States Patent No. 2,688,728, Carolus, dated September 7, 1954. A frequency-responsive meter 141 connected to one of the lines of area A adjusts a slidewire contact **142*a* of a slidewire 142 connected into the area requirement network 140. The left-hand side of this network includes a slidewire 143 having a contact 143*a* set at a point representing the desired frequency to be maintained on the system as a whole and which will usually be for the commercial frequency of 60 cycles per second. The left-hand portion of the network is energized from the indicated alternating-current source of supply as through series resistors and includes in a separate branch a rheostat 144 having its contact adjustable by knob 145 to provide the desired magnitude of an output voltage $E_{15}$ for a given change of position of slidewire contact 142*a***.

The right-hand portion of the area requirement network 140 includes a slidewire 146 with its contact **146*a* adjustable by a detector 147 responsive to the difference between the voltages $E_{15}$ and $E_{16}$. The voltage $E_{16}$ is derived from slidewire 146 energized from the indicated alternating-current supply, there being two equal resistors 148 and 149 between which connection from contact 142*a* is made by way of conductor 150. The area requirement network provides for adjustment of contact 146*a* by an amount representative of a desired change in generation. Such a change will be due to the load change on the system which produced the frequency variation as indicated by the frequency meter 141. When the changed generation has been accomplished, the frequency will have been returned to its selected value of 60 cycles per second. More particularly, the detector 147 through mechanical connection adjusts slidewire contact 146*a* in a network-balancing direction and concurrently moves contact 109*a* of the impulse generator 109** to the right or to the left for production of "raise" and "lower" pulses.

With an understanding of the principles of the invention as explained in connection with the simplified system of Fig. 1, it is to be understood that the invention is applicable to interconnected systems having a multiplicity of power sources and that the conductively coupled computer network is not only well adapted to the more complicated systems, but the remaining features of the invention provide a high degree of flexibility of control, making possible the inclusion of the effects of constraints which may arise in connection with the power generation of each of the sources. Limit circuits are readily provided.

As exemplary of the manner in which the foregoing features may be embodied in the system, there has been illustrated in Figs. 2 and 3 a modification of the invention of somewhat greater complexity with reference characters, where applicable, corresponding with those used in Fig. 1. In Figs. 2 and 3 there are provided three power sources, the added power source 3 being represented in the computer network 32A by the third column to which there is applied the voltage $E_{63}$ representative of the generation of the source 3. The generator control 155 for source 3 includes a governor-adjusting motor 156, the energization of which is controlled by relays 124 and 125, Fig. 3, energized under the control of amplifiers 157 and 158. Inasmuch as there has been added a third column to the computer network, it will be seen that an additional row has likewise been added to each of the other columns, the numbering sequence of the high-valued resistors and the computing resistors being consecutive and indicative of the function.

Where in Fig. 1 the generator 1 was taken as the reference source, in Figs. 2–3 the generator 2 has been made the reference source. By means of switches 161 and 162 either of the generators 1 and 2 may be selected as the reference source. By the addition of other switches any one of a multiplicity of generators may be selected as the reference source. More particularly, the output voltages $E_{41}$, $E_{42}$ and $E_{43}$ from the computer network 32A represent the quantity $$\left(1-\frac{\partial P_L}{\partial P_m}\right)$$

or unity minus the incremental transmission losses of the respective sources 1, 2 and 3.

In Figs. 2 and 3 there is associated with the output from a cathode-follower including a triode 164 and a cathode output resistor 165, a voltage divider including slidewire resistors 166, 167 and 168. The contact of slidewire 166 is adjusted by a detector 172 by way of mechanical connections 173 and 174. As will presently be explained, the detector 80 is short-circuited or made ineffective. A knob K serves simultaneously to adjust the contacts of slidewires 167 and 168. As explained in connection with Fig. 1, the output voltage derived by way of conductors 170 and 171 is representative of any required change in generation of source 1 to make its incremental cost of delivered power equal to that of the reference source 2.

As illustrated, a selector switch 176 applies the output voltage from conductors 170 and 171 to an indicating and/or recording instrument 177 by means of which the desired change of generation may be read on a scale 178 and recorded on a chart 179. The recording instrument is provided with an actuating mechanism 180 and a balancing slidewire 181. By actuating the selector switch, the change of generation required may be indicated and recorded for any of the other sources. For example, when operated to its third position, the instrument 177 will respond to indicate the change in generation for the source 3. In the intermediate position the instrument 177 will be responsive to change of generation for the reference source 2. Since it is the reference source, no change of generation will be indicated, and the instrument 177 will read zero. It reads zero because, as will be explained, there is no output signal from the cathode follower 96, 97.

With the parts in the illustrated position, it will now be assumed that the frequency-responsive meter 141 indicates a desired increase in generation. As a result, the detector 110 of the area requirement network 140 functions to move the contact 109*a* of the impulse generator 109 for the production of "raise" impulses which flow by way of conductor 111 to the several circuits extending to the generation controls for the generators 1, 2 and 3. With each raise impulse, each of the governor-adjusting motors 119, 135 and 156 will be energized simultaneously to increase the generation of each of the generators. However, if the lambda or incremental cost of delivered power of the generator 1 is greater than that of the reference source 2, its governor control motor 135 will not receive raise impulses. It will not receive them for the reason that the output voltage applied to conductors 170 and 171 will through amplifier 131 energize relay 133 to open the motor circuit which includes the raise field winding. However, with the lambda of the generator 3 equal to or less than that of source 2, the output voltage across conductors 185, 186 will have a polarity or phase such that the amplifier 157 will not energize relay 124, and the raise pulses will flow by way of contacts of relay 124 to the motor 156 by way of its raise field winding. For the third source, there will be a network identical with those provided for the sources 1 and 2 and which for simplicity has been indicated diagrammatically by the block 187.

As further exemplary of additional features which may be utilized in conjunction with the computer network 32A, there have been illustrated the relays 190–195 respectively energized under the control of amplifiers 196–201 to control the routing of raise and lower pulses to the respective governor control motors. For example, there is applied to the amplifier 196 a voltage derived from a slidewire 202 by its associated contact which is positioned on the slidewire to represent a maximum desired level of generation for the generator 1. If its generation exceeds the selected value, the voltage $E_{33}$ applied to conductors 69 and 69*a* exceeds the voltage derived from slidewire 202, and the difference voltage is in a direction as applied to the amplifier 196 to energize the operating coil of relay 190 to open its contacts. With the contacts of relay 190 in the open position, raise pulses derived from the pulse generator 109 by conductor 111 and the contacts of relay 133 cannot flow to the governor motor 135 and its "raise" field winding. Thus the level of generation for source 1 will be limited as determined by the setting of the slidewire contact on slidewire 202.

When the level of generation of generator 1 decreases below the predetermined value as determined by the position of the contact associated with slidewire 203, the voltage derived from that slidewire will exceed $E_{33}$, and the resultant input to the amplifier 197 will increase its output to energize the operating coil of relay 191 to cause it to open its contacts. The opening of the contacts of relay 191 opens the circuit for lower impulses from the pulse generator 109 and prevents further decrease in the level of generation of the generator 1. Thus it will be seen that when the voltage $E_{33}$ exceeds the voltage derived from slidewire 203 for amplifier 197, the amplifier has zero output and relay 191 remains closed. Similarly, so long as the voltage derived from slidewire 202 exceeds that of voltage $E_{33}$, the output of amplifier 196 is zero. Both amplifiers and their associated relays respond to a fixed range within which generation of generator 1 may be varied under the control of the pulse generator 109 to maintain equal lambda operation as between the several sources. When a limit is reached or when a particular generator does not respond to raise or lower impulses, the respective wattmeters reflect the existing unchanged generation, and thus there are at all times applied to the computing network 32A voltages representative of existing generation. Thus any constraints imposed are taken into account by the computer network in contrast with systems which respond to desired levels of generation instead of existing levels of generation.

Inasmuch as the source 2 was, for purposes of explanation, selected as the reference source, it will be understood that in the event its level of generation should reach a selected limit, a different source should then be selected as the reference source. To this end, the relays 192 and 193 may be provided with additional contacts 192*a* and 193*a* for energizing an alarm or warning light or to complete a circuit for a relay 192T automatically to operate the transfer switches 161 and 162 to change the reference source. More particularly, if switches 161 and 162 be actuated from their illustrated positions to their opposite circuit-closing positions, the generator 1 will become the reference source.

From the above description, it will be seen that the voltage-dividing network associated with the source 2, namely slidewire resistors 83, 93 and 103, may in Fig. 1 be omitted for the reason that there is not shown in Fig. 1 the instrument 177 for reading desired changes in level of generation to produce equal lambda operation. Thus the potential difference developed across the cathode resistor 97 may be applied directly to conductors 99 and 117. When the phase of the potential difference across cathode resistor 97 is in one direction, the amplifier 105 energizes relay 108, and when it is in the opposite direction, the amplifier 106 energizes the relay 107. In this manner the relays operate in response to change of phase selectively to open the raise and lower circuits for the generation of control including the relays 118 and 118*a*.

What is claimed is:

1. A computing network comprising a plurality of independent input circuits, a plurality of output circuits, a plurality of low-valued impedances, a plurality of high-valued impedances, connections for connecting a high-valued impedance in series on each side of each of said low-valued impedances, circuit connections for energizing from said input circuit said low-valued resistors through said series connections including said high-valued resistors, and circuit connections for including in a loop circuit in each of said output circuits selected low-valued impedances and excluding therefrom all of said high-valued impedances, all other loop circuits extending through said interconnected impedances including a plurality of said high-valued impedances.

2. A computer network comprising two groups of independent circuits, one group forming input circuits and the other group forming output circuits, a plurality of low-valued impedances, a plurality of high-valued impedances interconnected with said low-valued impedances, each said low-valued impedance being connected in series with and between a pair of said high-valued impedances, and circuit connections for including selected low-valued impedances in a loop in a circuit of one of said groups to the exclusion of all of said high-valued impedances and for connecting to the other group of said circuits selected low-valued impedances each in series with its associated high-valued impedances, all other loop circuits including a plurality of said high-valued impedances.

3. A computer network comprising two groups of independent circuits, one group forming input circuits and the other group forming output circuits, a plurality of low-valued impedances, a plurality of high-valued impedances interconnected with said low-valued impedances, each said low-valued impedance being connected in series with and between a pair of said high-valued impedances, circuit connections for including selected low-valued impedances in a loop in a circuit of one of said groups to the exclusion of all of said high-valued impedances and for connecting to the other group of said circuits selected low-valued impedances each in series with its associated high-valued impedances, all other loop circuits including a plurality of said high-valued impedances, and means for connecting together one side of each of said output circuits.

4. A computer network comprising two groups of independent circuits, one group forming input circuits and the other group forming output circuits, a plurality of low-valued impedances, a plurality of high-valued impedances interconnected with said low-valued impedances, each low-valued impedance being connected in series with and between a pair of said high-valued impedances, and circuit connections for including selected low-valued impedances in a loop in a circuit of one of said groups to the exclusion of all of said high-valued impedances and for connecting to the other group of said circuits selected low-valued impedances each in series with its associated high-valued impedances, all other loop circuits including a plurality of said high-valued impedances, said low-valued impedances having impedance values modified to compensate for current flow therethrough from loop circuits other than said output circuits.

5. An impedance network comprising a plurality of independent input circuits, a plurality of output circuits, a plurality of low-valued impedances, circuit connections for energizing by each of said input circuits associated ones of said impedances, a plurality of high-valued impedances, a high-valued impedance connected in series on each side of each of said low-valued impedances in the energizing path therefor, and circuit connections for including in each of said output circuits selected low-valued impedances and excluding all high-valued impedances, said connections effectively isolating said output circuits by including a plurality of high-valued impedances in every loop circuit other than said output circuits.

6. A computer network comprising two groups of independent circuits, one group forming input circuits and the other group forming output circuits, a plurality of low-valued resistors, a plurality of high-valued resistors interconnected with said low-valued resistors, each said low-valued resistor being connected in series with and between a pair of said high-valued resistors, circuit connections for including selected low-valued resistors in a loop in a circuit of one of said groups to the exclusion of all of said high-valued resistors and for connecting selected groups of said low-valued resistors, each in series with its associated high-valued resistors, respectively to the other group of said circuits, all other loop circuits including a plurality of said high-valued resistors.

7. A computer network comprising two groups of independent circuits, one group forming input circuits and the other group forming output circuits, a plurality of low-valued resistors, a plurality of high-valued resistors interconnected with said low-valued resistors, each said low-valued resistor being connected in series with and between a pair of said high-valued resistors, circuit connections for including a plurality of said low-valued resistors and their respective associated pairs of high-valued resistors across each of said input circuits, and circuit connections for including selected low-valued impedances in a loop in each of said output circuits to the exclusion of all of said high-valued resistors, all other loop circuits including a plurality of said high-valued resistors, said low-valued resistors having resistance values compensated for sneak currents from loop circuits including a plurality of said high-valued resistors and further modified in compensation for a differing total resistance of each low-valued resistor and its associated pair of resistors common to one of said input circuits.

8. A computer network comprising two groups of independent circuits, one group forming independent input circuits and the other group forming output circuits, a plurality of low-valued resistors, a plurality of high-valued resistors interconnected with said low-valued resistors, each said low-valued resistor being connected in series with and between a pair of said high-valued resistors, and circuit connections including adjustable taps to each of said low-valued resistors for including selected fractions thereof in a loop in a circuit of one of said groups to the exclusion of all of said high-valued resistors and for connecting to said other group of said circuits said low-valued resistors in series with its associated pair of high-valued resistors, all other loop circuits including a plurality of said high-valued resistors.

9. In a system for the determination of the loading of power sources interconnected by transmission lines, the combination of computing means having first and second groups of circuits, each of said circuits of said first group including multiple pairs of circuit components of large impedance, with each pair in series with an intermediate circuit component of low impedance, each of said circuits of said second group including a different one of said circuit components of said low impedance value of each circuit of said first group and excluding all of said large impedances, said impedances of said circuit components common to both groups of circuits having values for collectively inter-relating power generation of said sources and incremental transmission losses of said sources, and means for applying signals to said circuits of said first group representative of generation of said sources.

10. In a system for the determination of the loading of power sources interconnected by transmission lines, the combination of computing means having first and second groups of circuits, one group forming input circuits and the other group forming output circuits, a plurality of low-valued impedances, a plurality of high-valued impedances interconnected with said low-valued impedances, each said low-valued impedance being connected in series with and between a pair of said high-valued impedances, circuit connections for including selected low-valued impedances in a loop in a circuit of one of said groups to the exclusion of all of said high-valued impedances and for connecting to the other group of said circuits selected low-valued impedances each in series with its associated high-valued impedances, all other loop circuits including a plurality of said high-valued impedances, said low-valued resistors having impedances for collectively inter-relating power generation of said sources and incremental transmission losses of said sources, and means for respectively energizing said input circuits in accordance with the generation levels of said power sources.

11. The combination set forth in claim 10 in which the magnitude of each said low-valued resistor included in said output circuit is modified in compensation for sneak currents traversing paths including a plurality of said high-valued resistors.

12. The system of claim 10 in which there are provided means associated with each of said output circuits for producing a first signal representative of unity minus the incremental transmission loss from said source, means for producing a second signal representative of the existing incremental cost of generation of said source, means having applied thereto said second signal and adjusted in accordance with the desired incremental cost of delivered power from said source for producing an output signal representative of the ratio of the magnitude of said second signal and the magnitude of the desired incremental cost of delivered power from said source, means for subtracting said output signal from said first signal to produce a difference signal, and means for dividing said difference signal by the quantity $$\left[\frac{2c_m}{\lambda_r}+\frac{2B_{mm}}{f_m}\right]$$

to produce a signal representative of the change in generation at said source necessary to bring the incremental cost of delivered power from said source to said desired value, where $c_m$ is a constant entering into the computation of the incremental cost of generation for said source,
$B_{mm}$ is a self-constant for said source,
$f_m$ represents the cost of fuel at said station, and
$\lambda_r$ is equal to the desired incremental cost of delivered power.

13. The system of claim 10 in which there are provided means associated with each of said output circuits for producing a first signal representative of unity minus the incremental transmission loss from said source, means for producing a second signal representative of the existing incremental cost of generation of said source, means having applied thereto said second signal and adjusted in accordance with the desired incremental cost of delivered power from said source for producing an output signal representative of the ratio of the magnitude of said second signal and the magnitude of the desired incremental cost of delivered power from said source, means for subtracting said output signal from said first signal to produce a difference signal, means for dividing said difference signal by the quantity $$\left[\frac{2c_m}{\lambda_r}+\frac{2B_{mm}}{f_m}\right]$$

to produce a signal representative of the change in generation at said source necessary to bring the incremental cost of delivered power from said source to said desired value, where $c_m$ is a constant entering into the computation of the incremental cost of generation for said source,
$B_{mm}$ is a self-constant for said source,
$f_m$ represents the cost of fuel at said station, and
$\lambda_r$ is equal to the desired incremental cost of delivered power.

and means operative in response to said last-named signal for changing the generation of said source until said incremental cost of delivered power attains said desired value.

14. The system of claim 12 in which $\lambda_r$ is selected as the incremental cost of delivered power from one of said sources and in which means are provided operable in response to said last-named signal for relatively changing the generation of said sources to bring the incremental cost of delivered power from them to a value corresponding with $\lambda_r$.

15. A system for determining the change in generation of a power source interconnected with other power sources required to bring the incremental cost of delivered power from said source to a desired value comprising means for producing a first signal representative of unity minus the incremental transmission loss from said source, means for producing a second signal representative of the existing incremental cost of generation of said source, means having applied thereto said second signal and adjusted in accordance with the desired incremental cost of delivered power from said source for producing an output signal representative of the ratio of the magnitude of said second signal and the magnitude of the desired incremental cost of delivered power from said source, means for subtracting said output signal from said first signal to produce a difference signal, and means for dividing said difference signal by the quantity $$\left[\frac{2c_m}{\lambda_r}+\frac{2B_{mm}}{f_m}\right]$$

to produce a signal representative of the change in generation at said source necessary to bring the incremental cost of delivered power from said source to said desired value, where $c_m$ is a constant entering into the computation of the incremental cost of generation for said source,
$B_{mm}$ is a self-constant for said source,
$f_m$ represents the cost of fuel at said station, and
$\lambda_r$ is equal to the desired incremental cost of delivered power.

16. A system for regulating the change in generation of interconnected power sources required to bring their incremental costs of delivered power to a desired value, comprising a network having interconnected impedance elements for producing in output circuits thereof first signals representative of unity minus the incremental transmission losses from each of said sources, means for producing second signals representative of the existing incremental costs of generation of each of said sources, means including an impedance element for each of said sources having applied thereto one of said second signals and adjusted in accordance with the incremental cost of delivered power from a selected one of said sources for producing from each impedance element an output signal representative of the ratio of the magnitude of each said second signal and the magnitude of the incremental cost of delivered power from said selected source, means for subtracting each said output signal respectively from each said first signal to produce difference signals, and means for dividing said difference signals by the quantity $$\left[\frac{2c_m}{\lambda_r}+\frac{2B_{mm}}{f_m}\right]$$

to produce signals representative of the change in generation at each of said sources necessary to bring the incremental cost of delivered power from said sources to that of said selected source, where $c_m$ is a constant entering into the computation of the incremental cost of generation for said source,
$B_{mm}$ is a self-constant for said source,
$f_m$ represents the cost of fuel at said station, and
$\lambda_r$ is equal to the desired incremental cost of delivered power.

17. The system of claim 16 in which switching means are provided for selection of one of said sources as a reference source to which the incremental cost of delivered power from the remaining sources not subject to a constraint are brought.

18. The system of claim 16 in which there is provided switching means responsive to a constraint upon said selected source for selecting another of said power sources as a reference source for the incremental cost of delivered power therefrom and with reference to which corresponding incremental costs of the remaining sources are compared.

19. A system for determining the change in generation of a power source interconnected with other power sources required to bring the incremental cost of delivered power from said source to a desired value, comprising means for producing a first signal representative of unity minus the incremental transmission loss from said source, means for producing a second signal representative of the existing incremental cost of generation of said source, means having applied thereto said second signal and adjusted in accordance with the desired incremental cost of delivered power from said source for producing an output signal representative of the ratio of the magnitude of said second signal and the magnitude of the desired incremental cost of delivered power from said source, means for subtracting said output signal from said first signal to produce a difference signal, and means responsive to the sign of said difference signal for changing the generation at said source in direction to bring its incremental cost of delivered power to said desired value.

No references cited.